United States Patent [19]

Wolffing et al.

[11] 4,133,899

[45] Jan. 9, 1979

[54] FARINA MILLING PROCESS

[75] Inventors: Ralph M. Wolffing; Clifford J. Batten, both of Toledo, Ohio; Meade C. Harris, Jr., Rutherford, N.J.

[73] Assignee: Nabisco, Inc., East Hanover, N.J.

[21] Appl. No.: 818,416

[22] Filed: Jul. 25, 1977

Related U.S. Application Data

[63] Continuation of Ser. No. 667,392, Mar. 16, 1976, abandoned.

[51] Int. Cl.$^2$ ........................... A23P 1/00; B02C 4/06

[52] U.S. Cl. ....................................... 426/507; 241/11; 241/71; 241/235; 426/481; 426/518

[58] Field of Search ............... 426/507, 463, 518, 464, 426/519, 468, 479, 481; 209/3, 32, 33, 34, 35; 99/485; 241/24, 29, 78, 77, 76, 159, 235, 11

[56] References Cited

U.S. PATENT DOCUMENTS

| | | | |
|---|---|---|---|
| 250,564 | 12/1881 | McGinty et al. | 241/235 |
| 384,919 | 6/1888 | Mawhood | 241/235 |
| 1,784,762 | 12/1930 | Smith | 241/11 |
| 2,947,484 | 8/1960 | Szasz | 241/13 X |
| 3,001,727 | 9/1961 | Block et al. | 426/518 X |

OTHER PUBLICATIONS

Lockwood; "Flour Milling" 4th Ed., 1962; Henry Simon Ltd., Stockport England; copy in Gp. 170; pp. 277, 379, 285, 312, 314–316, 322, 338, 341, 344, 347.

Matz; "Cereals as Food and Feed"; The AVI Pub. Co. Inc., Westport, Conn. 1959; copy in Gp. 170; pp. 203–213.

*Primary Examiner*—Kenneth M. Schor

*Attorney, Agent, or Firm*—Gerald Durstewitz

[57] ABSTRACT

The process of milling wheat to produce a large proportion of coarse farina in which double tempered wheat is passed through a series of four identical sets of deeply and coarsely corrugated break rolls run sharp to sharp. The output of each roll is separated in size ranges. Substantially oversized particles from each break roll set are fed into the next break roll set in the series. Slightly oversized particles are fed through corrugated rolls to slightly reduce the size thereof, and to remove bran coat therefrom. Properly sized particles are air purified to remove bran particles and oversized bran particles are passed through additional breaking roll operations to further separate any endosperm particles therefrom.

10 Claims, 3 Drawing Figures

1st. TEMPER
2nd. TEMPER
BRAN DUSTER
SHORTS DUSTER
FEED
FEED
COARSE FARINA
REDUCTION SYSTEM
SIFTER #1
SIFTER #2
SIFTER #3
SIFTER #4
SIFTER #5
SIFTER #6
SIFTER #7
SIFTER #8
PURIFIER #1
PURIFIER #2
PURIFIER #3
PURIFIER #4
1 B
2 B
3 B
4 B
5 B
6 B
4 B
1 SIZ.
2 SIZ.
10
2.5/1
16
20
24
28
1.5/1
16 W
20 W
24 W
30 W
34 W
40 W
60 W
1410 μ
1050 μ
682 μ
471 μ
30
31
32
33
35
36
37
38

10
11
12
14
15
SLOW
FAST
SHARP TO SHARP

FARINA MILLING PROCESS

This is a continuation, of application Ser. No. 667,392, filed Mar. 16, 1976, now abandoned.

BACKGROUND OF THE INVENTION

The present invention relates to the milling of grain and more particularly to the production of farina.

Farina, as defined by U.S. government standards, is the food prepared by grinding and bolting cleaned wheat, other than durum and red durum wheat, to such fineness that it passes through a No. 20 U.S. standard sieve but not more than 3 percent passes through a No. 100 U.S. standard sieve. Farina is normally produced as a co-product of flour milling. In the conventional flour mill, the wheat is passed through a series of breaking and reduction operations designed to rapidly reduce the endosperm portion of the wheat berry to flour. The breaking operations typically include up to five roller milling units and the output of each unit is classified by size. A certain amount of flour is produced at each break and that is separated from the larger particles by bolting. The largest particles are directed to the next break roll, while the intermediate size particles (which include those of farina size) are air purified to remove bran particles and are passed to reduction roller mill units to be ground into flour. In the conventional flour mill a considerable portion of the output of the breaking operations in fine farina, and the mill operators can elect to extract a portion of this farina for use as hot breakfast cereal rather than use it to produce flour.

Most farina sold as hot breakfast cereal contains a high percentage of fine farina, i.e. particles which will pass through a No. 40 U.S. standard sieve. There is, however, a popular hot breakfast cereal product composed predominately of coarse farina particles of a size too large to pass through a No. 40 standard sieve. The conventional flour mill produces a very small amount of farina in the No. 20 to No. 40 standard sieve size. Therefore, in order to obtain a sufficient quantity of coarse farina to nationally market a popular breakfast cereal, it is necessary to purchase coarse farina from a large number of flour mills when and where it is available. Since flour mills differ in the way they grind, classify and purify their stock it is necessary to carefully blend the farina from various sources in order to provide a high quality and uniform product.

SUMMARY OF THE INVENTION

It is the object of the present invention to provide a process for milling wheat which provides a high proportion of coarse farina.

According to the present invention, the foregoing object is accomplished by providing a process of milling wheat comprising the steps of tempering the wheat, passing the tempered wheat through a series of deeply and coarsely corrugated break rolls to slowly reduce the particle size of the wheat, separating the particles exiting from the break rolls into a plurality of size ranges, passing the substantially oversized particles to the next break roll, passing slightly oversized endosperm particles between deeply corrugated sizing rolls to reduce their size slightly and remove bran coat therefrom, and air purifying all properly sized particles to remove bran.

BRIEF DESCRIPTION OF THE DRAWINGS

Preferred embodiments of the invention have been chosen for purposes of illustration and description and are shown in the accompanying drawings, forming a part of the specification, wherein.

DESCRIPTION OF THE PREFERRED EMBODIMENTS

Figures 1, 3:
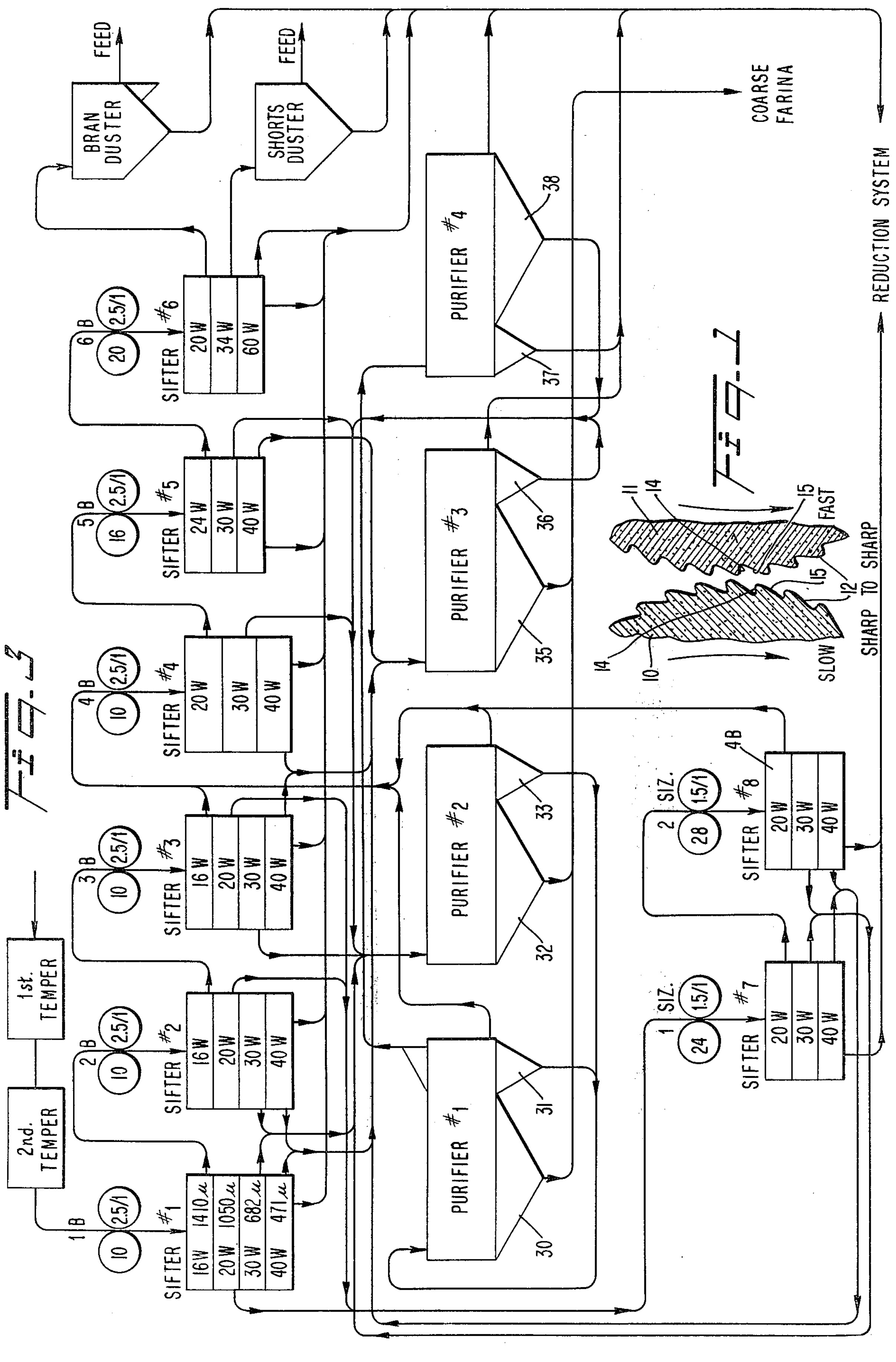
FIG. 1 is a fragmentary transverse sectional view of a set of milling rolls preferably used in milling processes according to the present invention.
FIG. 3 is a flow diagram of another embodiment of the process according to the present invention for producing farina having a high proportion of coarse farina which is within a narrow size range.

Referring to the drawings there are shown milling processes according to the present invention which comprises first and second tempering arrangements, a number of break roll sets, a number of sizing roll sets, a number of sifters, and a number of purifiers. The wheat utilized in connection with the processes of this invention are preferably of the hard spring or hard winter varieties, however, any hard wheat other than durum or red durum can be used. The wheat is processed to remove foreign matter and is scoured and air washed in accordance with standard procedures. The wheat is then given a first temper in which it is mixed with sufficient water to bring it from its natural moisture content of 11% to 13% to a moisture content of between about 13.5 and 16%. The moistened wheat is held in a tempering bin for from about 5 to 64 hours, and preferably from 8 to 64 hours, to allow the moisture to penetrate and become evenly distributed in the endosperm. The wheat is then given a second temper in which the total water content is raised by about 0.5 to 4% to a total moisture content of 15 to 18%. The wheat is then held for 10 to 120 minutes before milling to allow the moisture to be absorbed by the bran coat. The first temper is to condition the endosperm to reduce shattering of the endosperm and bran during milling. The second temper toughens the bran coat so that during milling it tends to be released from the endosperm in large pieces which are more readily separated from the endospem particles.

Following the second tempering period, the wheat berries are fed between the first set of break rolls. It is a feature of this invention that the size of the wheat particles is gradually reduced by the use of a large number of break roll sets, each set to provide a limited reduction in the size of the larger particles produced by the preceding set. The surface of the break rolls are cut to provide tooth shaped corrugations which are coarse and deep and extend helically along the length of the rolls. In FIG. 1 there is shown a representative break roll set which comprises a roll 10 that is driven slowly and a roll 11 that is driven at a substantially faster speed. The rolls 10 and 11 are formed with teeth 12 each of which have a generally radially oriented edge 14 and a generally tangentially oriented edge 15. On the roll 10, the teeth are oriented so that the edges 14 face away from the direction of rotation. The rolls are therefore arranged in the sharp to sharp tooth configuration wherein the wheat particles are held on one side by the edge 14 of a tooth on the slow roll 10 while the edge 14 of a tooth on the fast roll 11 moves against the other side of the particle tending to cut a large piece from the particle.

Figure 2:
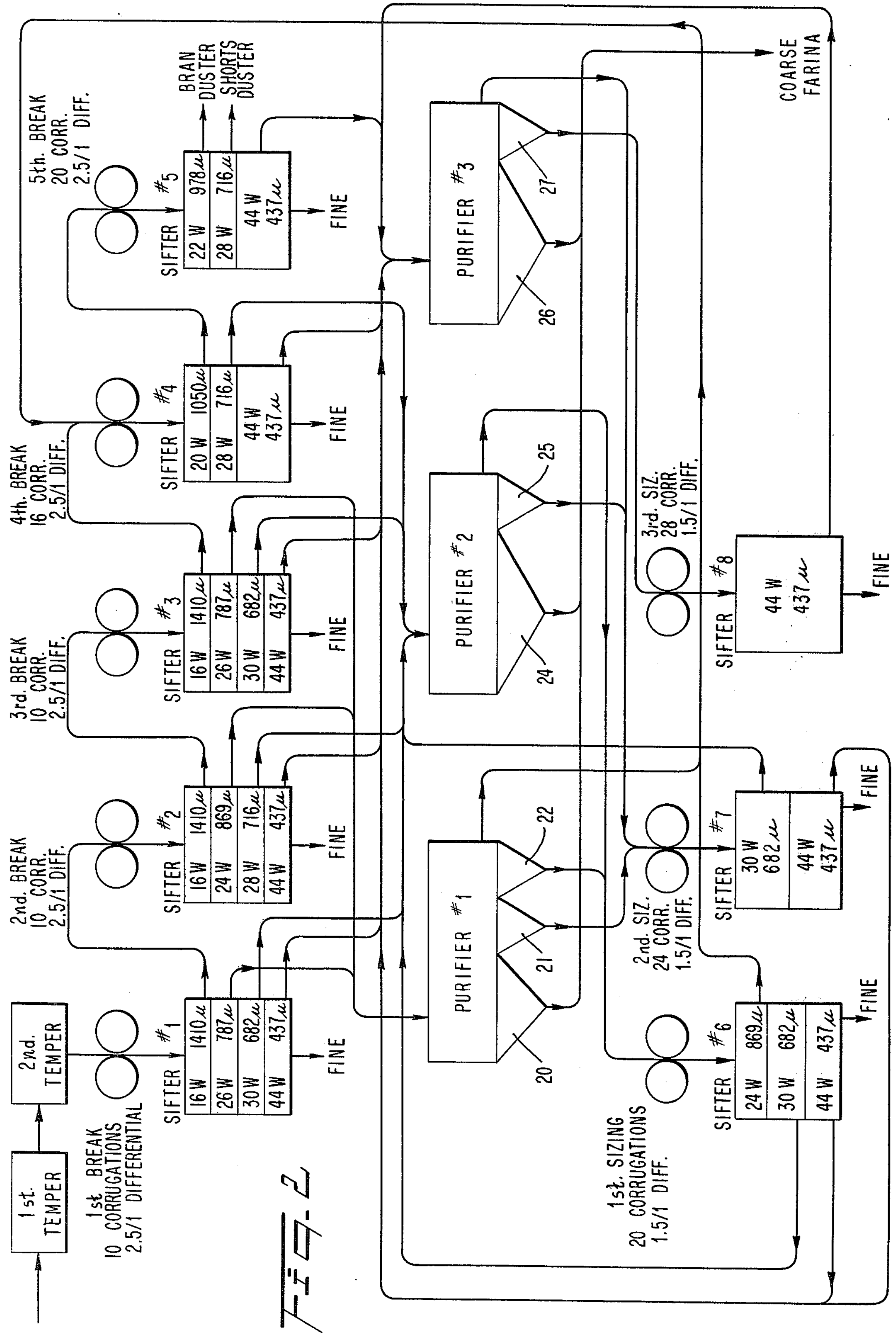
FIG. 2 is a flow diagram of a milling process according to the present invention for producing a high proportion of coarse farina.

Referring now to FIG. 2, there is shown a milling process in accordance with the present invention which comprises, in addition to the tempering arrangements, five pairs of break rolls, three pairs of sizing rolls, seven sifters and three purifiers.

The first, second and third break roll sets have 10 corrugations per inch making the pitch of the teeth 2.54 millimeters. The depth of the teeth measured radially with respect to the roll is 0.48 millimeters or 480 microns. It will be seen therefore that the first break rolls can be set so that the wheat berries fed into the rolls are cut into large pieces. The percentage of large particles produced by the first break roll can be controlled by adjusting the spacing between the two rolls. For example, using the break rolls described above, the percentage of the particles which will pass through a No. 20 U.S. standard sieve (particles less than 840 microns) can be varied between 9.5% and 40%. In either instance the particles which pass through the No. 20 standard sieve are mostly in the coarse farina size range with only about 6% being sized to pass through a No. 40 U.S. standard sieve (420 microns) and about 3% being sized to pass through a No. 60 U.S. standard sieve (250 microns). The second break rolls are set closer together to further subdivide the large pieces generated by the first break, and the third breakrolls are set still closer together to further subdivide the largest particles produced by the second break.

There is, of course, some disintegration of the endosperm particularly along the cleavage line, also the wheat particles tend to fracture upon the impact of the teeth.

The fourth break rolls have the same tooth shape as that shown in FIG. 1, however, the size of the teeth is reduced to provide 16 teeth per inch of circumference, the pitch of the teeth being 1.58 millimeters and the depth of the teeth is 297 microns. The fifth break rolls also have the same tooth shape as that shown in FIG. 1 with 20 corrugations per inch to provide a tooth pitch of 1.27 millimeters and tooth depth of 240 microns.

The wire bolting cloth used in the sifters and purifiers in each of the embodiments described herein is a commercial cloth which has larger openings for each mesh size than the U.S. standard.

The wheat particles flowing from the 1st break roll set are fed into sifter #1 which has four screen sets for separating the particles into size ranges. Those particles over 1410 microns (which will not pass through the No. 16 commercial sieves of the first screen set) are fed to the 2nd break rolls. The particles which pass through the No. 16 sieves and are too large to pass through the No. 26 commercial sieves of the second screen set are directed to purifier #1. Particles in this size range are between 787 and 1410 microns. The particles which pass through the No. 26 sieves but will not pass through the No. 30 commercial sieves of the third screen set have a size range of 787 to 682 microns and are fed into purifier #2. Purifier #3 receives the particles in the size range between 682 and 437 microns which pass through the No. 30 sieves but are stopped by the No. 44 commercial sieves of the fourth screen set.

The sifters #2 and #3 each have four screen sets. The "overs" from the first screen set in each of the sifters are over 1410 microns and are fed to the next break rolls for further reduction in size. The "overs" of the second screen sets are fed to purifier #1, the "overs" of the third screen set are fed to purifier #2, and the "overs" of the fourth screen set are fed to purifier #3. The "overs" of the second and third screen sets sifter #3 range between 787 and 1410 microns and between 682 and 869 microns respectively. In sifter #3 the second screen "overs" are between 787 and 1410 microns while the third screen "overs" are between 682 and 787 microns. The fourth screen "overs" are between 437 and 682 microns for sifter #3.

Sifters #4 and #5 have three screen sets each. In sifter #4, the first screen set is made up of No. 20 commercial sieves and the "overs" are directed to the fifth break roll. The second screen set is made up of No. 28 commercial sieves with the "overs" directed to purifier #2. The third screen set is made up of No. 44 commercial sieves and the overs are directed to purifier #3. Sifter #5 is provided with a No. 22 commercial sieve first screen set, a No. 28 commercial sieve second screen set, and a No. 44 commercial sieve third screen set. The "overs" of the first screen set are large bran particles and are sent to a bran duster in which the bran is impacted and bolted to remove any flour which might be adhering thereto. The "overs" of the second screen set are shorts, that is, smaller bran particles and wheat germ particles. The shorts are passed through a shorts duster to remove adhering flour and are sold as feed. The dusted bran may be combined with the shorts as feed or sold separately. The "overs" of the third screen set are directed to purifier #3.

Each of the purifiers have four screens positioned edge to edge and at a slight angle so that with vibration of the screens the particles move from screen to screen until they pass through one of the screens or move off the end of the last and lowest screen. The screens vary in mesh size, the smallest mesh screens being on the high end of the screen set and the largest mesh screen being on the low end of the set. The particles to be purified are deposited on the small mesh screen at the high end of the screen set and flow downhill across the larger mesh screens while an air current is directed upwardly through the screens to stratify the particles. The vertical air flow produces a lifting effect upon the particles, the intensity of which depends upon the size, shape and density of the individual particles. The bran particles generally have a large ratio of surface area to weight and tend to be lifted by the air to form a layer riding on top of the endosperm particles which normally have less surface area for a given weight. Small bran particles are carried off with the air stream.

As the particles move across the screen set, progressively larger particles pass through the progressively coarser screens. Not all of the particles in the mass of the material treated at any one time pass through the first screen which will accept them. A significant portion of the particles become entrained with larger particles and pass through the screen with those particles. The particles flowing through the individual screens are directed (by gravity alone or by internal baffles) into one of a number of collecting hoppers. The upper stratified layer of bran particles moves off the tail end of the screen.

The particles directed to purifier #1 from the sifters generally have a particle size range of 787 to 1410 microns, however, some particles will be included therewith which are more than 1410 microns in length but have a transverse dimension of less than that figure and have passed through the screens endwise. Purifier #1 has three collecting hoppers 20, 21, and 22. The purified particles which are directed into the first hopper 20 are those which have a particle size of less than 840 microns and therefore have a general size range of between 787 and 840 microns. These particles are collected as coarse farina. The purified particles which are directed to the second hopper are generally those which are slightly oversized including sizes from 840 microns to the 1000 to 1200 micron range. These particles are directed to the second sizing rolls for size reduction. The particles directed to the third hopper are larger oversized particles ranging up to 1410 microns and include those elongated particles substantially oversized in one direction which passed through the sifter screens endwise. These particles are directed to the first sizing rolls for size reduction.

The particles in the upper layer which move off the tail end of the purifier screening are predominately bran particles to which endosperm particles may be adhering. These "overs" are directed to the 4th break rolls for dislodging the endosperm particles from the bran fibers.

The particles directed to purifier #2 from the sifters have a particle size range between 682 and 1050 microns. The purifier #2 has two collecting hoppers 24 and 25. The particles directed to the first hopper 24 range in size generally from 682 to about 840 microns and are collected as coarse farina. The particles directed to the hopper 25 are slightly oversized ranging from 840 to about 978 and are directed to the second sizing rolls for size reduction. Slightly oversized endosperm particles and stratified bran particles constitute the "overs" of the purifier and are directed to the first sizing rolls. The oversized particles are reduced in size by the sizing rolls. The bran particles flow through the sizing rolls and are directed to the fourth break roll from the first screen in sifter #6.

The third purifier receives particles ranging in size from 437 to 716. The purified particles between 437 and about 546 flow into the hopper 26 and are collected as coarse farina. The particles generally between 546 and 716 flow to the hopper 27 and are directed to the third sizing rolls to dislodge endosperm particles from bran particles so that the bran can be stratified and passed off the tail of the purifier screens. The larger particles and the stratified bran particles flowing off the end of the screen are directed to the second sizing rolls where the oversize endosperm particles are reduced in size. The bran particles are retained by the No. 30 screen in sifter #7 and are cycled through purifier #2 and the first rolls to the bran duster.

The first sizing rolls receive particles generally between about 1000 and 1410 microns from the purifier #1 and particles having a dimension larger than about 978 microns from the purifier #2. As previously stated those particles from purifier #1 are made up of slightly oversized endosperm particles, some elongated endosperm particles which are substantially oversized in one dimension, and coarse bran fibers attached to endosperm particles. The material received from purifier #2 is largely coarse bran fibers weighted down by endosperm particles attached thereto.

The first sizing rolls are formed with deep tooth shaped corrugations, there being 20 corrugations to the inch. The rolls are driven at different speeds, the fast roll being driven at a rate of 1.5 times the rate of the slow roll. The tooth shaped corrugations of the two rolls are oriented so that the teeth are driven in a "sharp to sharp" configuration. The first sizing roll operates to slightly reduce the size of the oversized endosperm particles, to dislodge endosperm particles from bran fibers in order that the purifier may effect a separation of endosperm and bran particles.

The particles issuing from the first sizing roll is directed into sifter #6 which contains a set of No. 24 sieves, a set of No. 30 sieves and a set of No. 44 sieves.

The "overs" on the No. 24 sieves are more than 869 microns and are largely large bran particles. These are directed to the 4th break rolls to dislodge any endosperm particles adhering thereto. The particles which pass through the No. 24 sieves but are stopped by the No. 30 sieves are large farina particles with some bran flakes. These particles are returned to the purifier #2 for repurification and separation. The particles which pass through the No. 30 sieves and are stopped by the No. 44 sieves are between 437 and 682 microns in size. These particles also are coarse farina together with some bran flakes and are directed to the purifier No. 3 for purification.

The 2nd sizing rolls receive slightly oversized endosperm particles, in the range of 840 to 1190 microns, from purifier #1 and slightly oversized endosperm particles in the range of 840 to 978 microns, from purifier #2. The output of the 2nd sizing rolls is directed to the sifter #7 which is provided with a set of No. 30 sieves and a set of No. 44 sieves. The 2nd sizing rolls performs the same general functions as the 1st sizing rolls. The 2nd sizing rolls have the same type of tooth configuration except they are formed with 24 corrugations per inch. The fast roll is driven at a speed of 1.5 times the speed of the slow roll and the teeth are oriented in a sharp to sharp configuration. The particles which are stopped by the No. 30 sieves of sifter #7 are directed to purifier #2. The particles which are stopped by the No. 44 sieves are directed to purifier #3.

The third sizing rolls are formed with the same shape tooth as the other sizing and break rolls but the teeth are smaller, there being 28 corrugations to the inch. The rolls are driven with a differential of 1.5 to 1 and the teeth are oriented in the sharp to sharp configuration. The particles exiting from the 3rd sizing roll set are directed into sifter #8 which has a single set of No. 44 sieves. The particles which do not pass through the sieves contain some endosperm particles and bran and are returned to purifier #3 for farina recovery, the bran being removed through purification.

EXAMPLE #1

As a specific example, hard winter wheat having a moisture content of 12.0% was mixed with sufficient water to bring the total water content to 14.3%. The wheat was stored in a tempering bin for 18 hours to allow the moisture to diffuse throughout the wheat berries. The wheat was then fed through a mixing conveyor where it was mixed with sufficient water to bring the total water content to 15.2%. The wheat was held for 20 minutes to allow this added water to soak into the bran coat of the wheat berries and then fed into the 1st break rolls of the system of FIG. 2 at a rate of 125 bushels per hour. The spacing between the break rolls in each set was adjusted so that the break release, that is, the percentage of wheat particles issuing from the break rolls which will pass through a No. 20 standard sieve, were as follows: 1st break — 19.5%, 2nd break — 24.5%, 3rd break — 38%, 4th break — 68%, 5th break — 64%.

In this milling operation, 33.17% of the output consisted of coarse farina of which 6% was larger than 840 microns, 24.5% was between 595 and 840 microns, 52.5% was between 420 and 595 microns, 14.5% was between 250 and 420 microns, and 2.5% was smaller than 250 microns. In this example, the fine material which passed through the finest sieves of each of the sifters was passed through a series of reduction rolls and reduced to flour according to standard practice. Of the total output of the system, 40.39% was flour, 6.98% was clear flour, and 19.46% was feed.

Of the coarse farina produced, 19.71% was extracted at the purifier No. 1, 29.16% was extracted at purifier No. 2, and 51.13% was extracted at purifier #3. Of the farina from purifier #1, 58% was over 840 microns, 40.5% was between 595 and 840 microns, and 1.4% was between 420 and 595 microns. The farina from purifier #3 consisted of 1.0% which was over 840 microns, 19.0% which was between 595 and 840 microns, 67.5% which was between 420 and 595 microns, and 12.5% was between 250 and 420 microns. The size distribution of the particles being directed to purifier No. 2 was not specifically measured during this trial, however, it can be stated with accuracy from experience and observation that substantially all of this material was between 420 and 840 microns with more material being above 595 microns than below that value.

EXAMPLE #2

In a second trial run with the similar wheat used in Example #1, the spacing of the 1st, 2nd and 3rd break rolls were changed so that the percentage of material exiting from the rolls which would pass through a No. 20 standard sieve was as follows: 1st break — 34.5%, 2nd break — 44.5%, 3rd break — 47.0%. In this run, the output of the milling operation consisted of 34.15% coarse farina, 32.96% flour, 7.29% clear flour, and 25% feed. The coarse farina consisted of 6% larger than 840 microns, 29% between 595 and 840 microns, 50.5% between 420 and 595 microns, and 1.5% smaller than 250 microns. The farina produced from purifier #1 consisted of 50.5% over 840 microns, 48% between 595 and 840 microns, and 1.5% between 420 and 595 microns. The farina from Purifier #3 consisted of 1% larger than 840 microns, 24% between 595 and 840 microns, 66.5% between 420 and 595 microns, and 8.5% between 250 and 420 microns. The coarse farina was extracted as follows: 20.99% from Purifier #1, 27.48% from Purifier #2, and 51.53% from Purifier #3.

Referring now to FIG. 3, there is shown another embodiment of the present invention which includes in addition to the two tempering arrangements, six pairs of break rolls, two pairs of sizing rolls, eight sifters and four air purifiers.

The first, second, third and fourth break rolls each have 10 corrugations per inch, the tooth shape and dimensions being identical to that of the FIG. 2 embodiment. The fifth break rolls have the same tooth shape as that shown in FIG. 1, however, the size of the teeth is reduced to provide 16 teeth per inch of circumference. The sixth break rolls have the same shape teeth with 20 corrugations per inch of circumference. The particles flowing from each break roll set are directed to the corresponding sifter.

Sifters #1, #2 and #3 each have four sets of screens, the four sets being made of No. 16, No. 20, No. 30 and No. 40 commercial sieves respectively. In each instance, the substantially oversized particles, that is, those which are above 1410 microns and therefore will not pass through the No. 16 sieves, are directed to the next break roll set. The particles which cannot pass through the No. 20 sieves range in size from 1050 to 1410 microns and are directed to the 1st sizing rolls for size reduction. The particles which are smaller than 1050 microns and larger than 682 microns are caught by the No. 30 sieve and are directed to air purifier #2. The particles which are smaller than 682 microns and larger than 471 microns are stopped by the No. 40 sieve and are directed to Purifier #3. These last two size ranges of particles are within the desired size range for coarse farina and are fed into the air purifiers to separate bran particles mixed therewith.

Sifters #4, #5 and #6 each have three sets of screens. Sifter #4 has a first screen set made up of No. 20 sieves, a second set made up of No. 30 sieves, and a third set made up of No. 40 sieves. The "overs" on the No. 20 sieves are directed to the fifth break rolls. These are largely bran particles which may have endosperm particles adhering thereto. The "overs" on the No. 30 and the No. 40 sieves are respectively directed to purifier No. 2 and purifier No. 3 to remove bran particles from these coarse farina particles. Sifter #5 has a first screen set of No. 24 sieves, a second screen set of No. 30 sieves, and a third screen set of No. 40 sieves. The "overs" on the No. 24 sieves are directed to the 6th break rolls. The coarse farina sized overs on the No. 30 and No. 40 sieves are directed to purifiers #2 and #3 respectively for removal of bran particles. Sifter #6 has a No. 20 sieve screen set, a No. 34 sieve screen set and a No. 60 sieve screen set. The "overs" on the No. 20 sieve are bran particles and are directed to a bran duster for dislodging flour and other small endosperm particles adhering thereto. Both the "overs" and the "throughs" of the No. 60 sieve are combined with the "throughs" of sifters #1 to #5. These particles include flour and fine farina. The fine farina particles may be separated from the flour for use in hot cereals or they may be passed through a reduction system to reduce them to flour.

Each of the purifiers have four or more screens positioned edge to edge and at a slight angle and are vibrated so that the particles move from screen to screen. The screens vary in mesh size, the smallest mesh screen being on the high end of the set and the largest mesh screen at the low end. The particles are deposited on the high end and move down hill across the screens as an air current is moved upwardly through the screens.

The particles flowing to purifier #2 have passed through a No. 20 sieve having openings of 1050 microns and have been caught by a No. 30 sieve having opening of 682 microns. These particles therefore generally range between 682 and 1050 microns and include some elongated endosperm particles and bran fibers which exceed 1050 microns in length and some particles smaller than 682 microns which have become entrained with the larger particles. As the particles pass through the purifier, the lighter bran particles unencumbered by endosperm particles are stratified by the air current. Purifier #2 is provided with two collection hoppers 30 and 31. The endosperm particles generally smaller than 840 microns are directed to the hopper 30 and are collected as coarse farina. The larger particles up to about 1410 microns are directed to Purifier #1. The "overs" of purifier #2, which include large particles and stratified bran, are directed to the fourth break rolls where large endosperm particles are reduced in size and where endosperm particles are dislodged from large bran particles.

Purifier #1 is provided with two collection hoppers 32 and 33. The particles directed to Purifier #1 from Purifier #2 are generally up to about 1410 microns. Those particles which are below 840 microns are directed to hopper 32 and are collected as coarse farina. The largest particles are directed to the 4th break rolls. The particles which are generally between 840 and about 1000 microns are directed to hopper 33 and [are directed to hopper 33 and] are recycled to the input end of purifier #1 to separate out and remove loose bran and maintain efficiency by keeping sufficient material on the screens to keep the air velocity down to a value which will not carry away excessive quantities of fine endosperm particles.

Purifier #3 receives the "overs" of the No. 40 screens of sifters 1 through 5, 7 and 8 which are between 682 and 471 microns and may contain elongated particles having greater maximum dimensions and entrained smaller particles. The particles within the stated range and those smaller are directed to a hopper 35 and are collected as coarse farina. Larger particles (up to about 1410 microns) are redirected to purifier No. 2 for further bran separation and the largest particles are directed to the flour production system which contains further sifters for removing bran particles from the flour produced.

The particles aspirated from Purifier #1 are fed into purifier #4 and may contain both bran and flour or fine farina particles. The flour and finest farina particles are collected in the hopper 37 and are directed to the flour production system. The medium range particles are collected in hopper 38 and are recycled to Purifier #2. The large and the stratified particles (the "overs") are directed to the flour production system.

The first and second sizing rolls have 24 and 28 corrugations per inch respectively and are driven sharp to sharp with the fast roll being driven 1.5 times the speed of the slow roll.

The sifters #7 and #8 each have three sets of screens, the first set containing No. 20 sieve commercial screens, the second set containing No. 30 sieve commercial screens, and the third set containing No. 40 commercial screens.

The first sizing roll receives the slightly oversized particles which cannot pass through the No. 20 commercial sieve screens in sifters #1, #2 and #3. These particles are given a light grind by the first sizing rolls to slightly reduce their size. The particles exiting from the first sizing rolls and which are not yet small enough to readily pass through the No. 20 sieves of sifter #7 are passed through the second sizing rolls. Any particles exiting from the second sizing rolls which will still not pass readily through a No. 20 commercial sieve are directed to the 4th break rolls. These particles are normally bran particles having endosperm particles adhering thereto. The particles which are "overs" of the No. 30 screens of the sifters 7 and 8 are directed to purifier #2 and the "overs" of the No. 40 screens are directed to purifier #3. The particles passing through the No. 40 screens are collected as fine farina or reduced to flour.

EXAMPLE #3

Hard winter wheat having a moisture content of 12.6% was tempered for 18 hours to bring its moisture content to 14.0%. It was then given a second temper for about 20 minutes to raise the total moisture content to 15.4% to toughen the bran coat. The tempered wheat was then fed into the 1st break rolls of the system of FIG. 3 at a rate of 110 bushels per hour. The spacing between the break rolls were adjusted so that the break release (the percentage of ground wheat particles which will pass through a No. 20 U.S. standard screen were as follows: 1st break — 10%, 2nd break — 19%, 3rd break — 17.5%, 4th break — 36.5%, 5th break — 51%, 6th break — 61%. The fine particles generated during the milling were ground to flour according to standard procedures.

The output of this milling operation consisted of 30.3% coarse farina, 31.93% flour, 7.71% clear flour, and 29.33% feed. The course farina consisted of 3.0% larger than 840 microns (over a No. 20 standard sieve), 48% between 595 and 840 microns (over a No. 30 standard sieve), 42.5% between 420 and 595 microns (over a No. 40 standard sieve), 4% between 250 and 420 microns (over a No. 60 standard sieve) and 2.5% smaller than 250 microns (through a No. 60 standard sieve).

Of the coarse farina produced, 38.16% was extracted from purifier No. 1, 35.99% was extracted from purifier No. 2, and 25.85 was extracted from purifier No. 3. Of the coarse extracted from purifier No. 1, 10% was greater than 840 microns, 66% was between 595 and 840 microns, 23% was between 420 and 595 Microns, and 0.5% was between 250 and 420 microns. The coarse extracted from purifier No. 2 consisted of 4% over 840 microns, 53% between 595 and 840 microns, 38.5% between 420 and 595 microns, and 3% between 250 and 420 microns. The coarse farina from purifier No. 3 consisted of a trace larger than 840 microns, 24.5% between 595 and 840 microns, 72% between 420 and 595 microns, and 4% between 250 and 420 microns.

EXAMPLE #4

In another milling run hard winter wheat having a moisture content of 12.6% was given a long first temper to raise the moisture content to 13.8% and a short second temper to raise the moisture content to 15.4%. The wheat was then milled by the system disclosed in FIG. 3. The break rolls were adjusted to give the following break release values with respect to a No. 20 standard sieve: 1st break — 10%, 2nd break — 19.5%, 3rd break — 18%, 4th break — 34%, 5th break — 49.5%, 6th break — 61.0%. The output of the milling run was composed of 26.69% coarse farina, 31.49% flour, 6.94% clear flour, and 34.88% feed. The coarse farina included 1.5% over 840 microns, 48% between 595 and 840 microns, 45% between 420 and 595 microns, 4% between 250 and 420 microns, and 1.5% smaller than 250 microns.

The percentage of the total coarse farina which was extracted from each of the purifiers was as follows: 19.01% from purifier #1; 50.65% from purifier #2; and 30.34% from purifier #3. The coarse farina extracted from purifier #1 was composed of 3% over 840 microns, 62% between 595 and 840 microns, 32.5% between 420 and 595 microns, and 2% between 250 and 420 microns. The farina particles from purifier #2 included 2.5% over 840 microns, 60% between 595 and 840 microns, 31% between 420 and 595 microns, and 3.5% between 250 and 420 microns. The distribution of farina particles from purifier #3 consisted of 12.5% between 595 and 840 microns, 77.5% between 420 and 595 microns, and 10% between 250 and 420 microns.

It will be seen from the foregoing that the present invention provides a process for milling wheat which provides a high proportion of coarse farina in the No. 20 to No. 40 U.S. standard sieve size.

We claim:

1. The process of milling wheat other than durum and red durum wheat to produce at least about 30 percent coarse farina of which between about 77% and 93% is within the range of 840 to 420 microns comprising the steps of:

(a) tempering the wheat to condition the endosperm of the wheat berry so as to reduce shattering upon grinding and to toughen the bran coat;

(b) passing the tempered wheat through a series of three sets of deeply and coarsely corrugated break rolls having a substantially equal number of corrugations per inch of about 10 corrugations per inch said corrugation being of a depth of at least about 480 microns and having teeth arranged to run in sharp to sharp configuration;

(c) separating the particles exiting from the break rolls into a plurality of size ranges which include properly sized particles in said coarse farina ranges, substantially oversized particles being predominantly over about 1400 microns, slightly oversized particles being predominantly in the range of about 840 to about 1400 microns, and undersized particles being predominantly below about 420 microns;

(d) the first set of break rolls receiving the whole wheat berries and the second and third break roll sets receiving the substantially oversized particles exiting from the first and second sets of break rolls;

(e) reducing the size of the slightly oversized particles by means of a sizing roll operation;

(f) separating the particles exiting from the sizing roll operation into size ranges including properly sized particles in said coarse farina range, slightly oversized particles, and undersized particles; and (g) air purifying all properly sized particles to remove bran.

2. The process according to claim 1 including the steps of:

(h) directing the substantially oversized particles issuing from the third break roll set to the first of at least two additional break roll sets;

(i) separating the particles exiting from said first additional break roll set into oversized, properly sized, and undersized particles;

(j) directing the oversized particles of step (i) to the second additional break roll set.

3. The process according to claim 2 including the step of:

(k) directing oversized particles exiting from the sizing roll operation to the first additional break roll set.

4. The process according to claim 3 wherein said first additional break roll set is deeply and coarsely corrugated having about 10 teeth per inch arranged to run in sharp to sharp configuration.

5. The process according to claim 4 wherein the remaining of said additional break roll sets are provided with significantly finer corrugations than 10 per inch.

6. The process according to claim 5 wherein the particles exiting from the first three break roll sets are separated by size in step (c) by means of sifters, the slightly oversized particles being directed directly to the sizing roll operation.

7. The process according to claim 6 wherein the sizing roll operation includes two sets of sizing rolls, the oversized particles exiting from the first sizing roll set being directed to the second sizing roll set.

8. The process according to claim 3 wherein the slightly oversized and properly sized particles separated in step (c) are directed to an air purifier and the slightly oversized particles are directed from the air purifiers to the sizing roll operation.

9. The process according to claim 1 wherein said tempering step includes a first temper in which the wheat is mixed with sufficient water to bring it to a moisture content of between 13.5 and 16% and held in a tempering bin for from 5 to 64 hours to allow the added water to become evenly distributed in the endosperm, and a second temper in which the wheat is mixed with additional water to raise the total moisture content to 15 to 18% and held for 10 to 120 minutes to allow the added moisture to be absorbed by and toughen the bran coat.

10. The process according to claim 1 wherein said step (e) includes the use of corrugated rolls each having about 20 to 28 corrugations to the inch.

* * * * *